United States Patent
Shenaq et al.

(10) Patent No.: US 9,725,022 B2
(45) Date of Patent: Aug. 8, 2017

(54) PIVOTING SPRING LOADED WEB GUIDE

(71) Applicant: Ford Global Technologies, LLC, Dearborn, MI (US)

(72) Inventors: Mohammed Shenaq, Dearborn, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 5 days.

(21) Appl. No.: 14/926,034

(22) Filed: Oct. 29, 2015

(65) Prior Publication Data

US 2017/0120788 A1 May 4, 2017

(51) Int. Cl.
*B60R 22/20* (2006.01)
*B60N 2/68* (2006.01)
*B60R 22/18* (2006.01)

(52) U.S. Cl.
CPC .............. *B60N 2/688* (2013.01); *B60R 22/18* (2013.01); *B60R 22/20* (2013.01); *B60R 2022/1818* (2013.01); *B60R 2022/207* (2013.01)

(58) Field of Classification Search
CPC  B60N 2/688; B60N 2/265; B60N 2002/2818; B60R 2022/1818; B60R 2022/1825; B60R 2022/1831; B60R 2022/1837; B60R 2022/1843; B60R 2022/207; B60R 22/20; B60R 22/201; B60R 22/202; B60R 22/203; B60R 22/205
USPC .......................... 280/808; 297/473, 483, 484
See application file for complete search history.

(56) References Cited

U.S. PATENT DOCUMENTS

| | | | |
|---|---|---|---|
| 5,544,917 A | 8/1996 | Loxton et al. | |
| 5,556,171 A | 9/1996 | Busch | |
| 5,658,051 A | 8/1997 | Vega et al. | |
| 5,730,499 A | 3/1998 | Salisbury | |
| 6,375,043 B1 | 4/2002 | LeBlanc | |
| 6,474,691 B2 | 11/2002 | Izume et al. | |
| 6,520,588 B1 * | 2/2003 | Busch ................ | B60R 22/26 280/808 |
| 6,749,223 B2 | 6/2004 | Kazuo et al. | |
| 6,846,020 B2 | 1/2005 | Xu | |

(Continued)

FOREIGN PATENT DOCUMENTS

| | | |
|---|---|---|
| CN | 101421135 | 4/2009 |
| EP | 1514748 A1 | 10/2004 |

(Continued)

OTHER PUBLICATIONS

Non-Final Office Action dated Jan. 17, 2017; U.S. Appl. No. 14/926,037; 22 pages.

(Continued)

*Primary Examiner* — Keith J Frisby
(74) *Attorney, Agent, or Firm* — Frank A. MacKenzie; Bejin Bieneman PLC

(57) ABSTRACT

A seatbelt web guide assembly adapted to be fixed to a seat back comprises a web guide in the shape of a loop and a pivot adapted to be fixed to a seat back and defining a first pivot axis. A connector is disposed between and connects the web guide to the pivot at a position in which the web guide is spaced from the first pivot axis. The pivot has a first part and a second pivot part. The second pivot part is rotatable with respect to the first part about the pivot axis, and the connector is fixed to the second pivot part.

14 Claims, 8 Drawing Sheets

(56) References Cited

U.S. PATENT DOCUMENTS

| | | |
|---|---|---|
| 7,469,928 B2 | 12/2008 | Clute |
| 7,520,532 B2 | 4/2009 | Bell et al. |
| 7,571,934 B2 | 8/2009 | Bell et al. |
| 7,618,097 B2 * | 11/2009 | Ghatge ................... B60R 22/26 297/473 |
| 8,002,358 B2 | 8/2011 | Marriott et al. |
| 8,376,407 B2 | 2/2013 | Adolfsson et al. |
| 8,479,863 B2 | 7/2013 | Adolfsson et al. |
| 2002/0011726 A1 | 1/2002 | Izume et al. |
| 2003/0020272 A1 | 1/2003 | Yoshino et al. |
| 2004/0253048 A1 * | 12/2004 | Schulz ................... B60R 22/24 403/122 |
| 2008/0100051 A1 | 5/2008 | Bell et al. |
| 2008/0309111 A1 | 12/2008 | Marriott et al. |
| 2009/0079242 A1 | 3/2009 | Erlingstam et al. |
| 2010/0127553 A1 | 5/2010 | Surgeon et al. |
| 2011/0316321 A1 | 12/2011 | Kujawa et al. |
| 2015/0266448 A1 * | 9/2015 | Aoki ...................... B60R 22/20 297/313 |

FOREIGN PATENT DOCUMENTS

| | | |
|---|---|---|
| EP | 2719576 A1 | 10/2013 |
| JP | 363270263 A | 11/1988 |
| JP | 01229744 | 9/1989 |
| WO | 2007107881 A1 | 9/2007 |

OTHER PUBLICATIONS

UK Search Report dated Apr. 20, 2017 (4 pages).
UK Search Report dated Apr. 18, 2017; UK Appl. No. 1618088.7 (3 pages).

* cited by examiner

PIVOTING SPRING LOADED WEB GUIDE

BACKGROUND

A seat belt presently used in passenger vehicles is a three point restraint that includes a length of webbing providing a shoulder harness portion and a lap belt portion. The shoulder harness portion extends across a seat occupant's shoulder on a first side of the occupant, and crosses the occupant's torso diagonally to a second side of the occupant at or near the occupant's hip. A path of the webbing may cause the webbing to engage the occupant in a location that chafes the occupant or is otherwise uncomfortable to the occupant. Certain seating locations, such as second row seats in some sport vehicles present particular challenges because of the location of seat belt retractors for those locations. There is a particular challenge in providing webbing paths or routings for such retractor locations that are suited to the comfort of occupants of a wide range of sizes and shapes. It is desirable to provide seat belt routing that is not an irritant to the occupant, as such an irritant may discourage the occupant from wearing the seat belt.

DETAILED DESCRIPTION

Relative orientations and directions (by way of example, upper, lower, bottom, rearward, front, rear, back, outboard, inboard, inward, outward) are set forth in this description not as limitations, but for the convenience of the reader in picturing at least one embodiment of the structures described.

Figure 1:
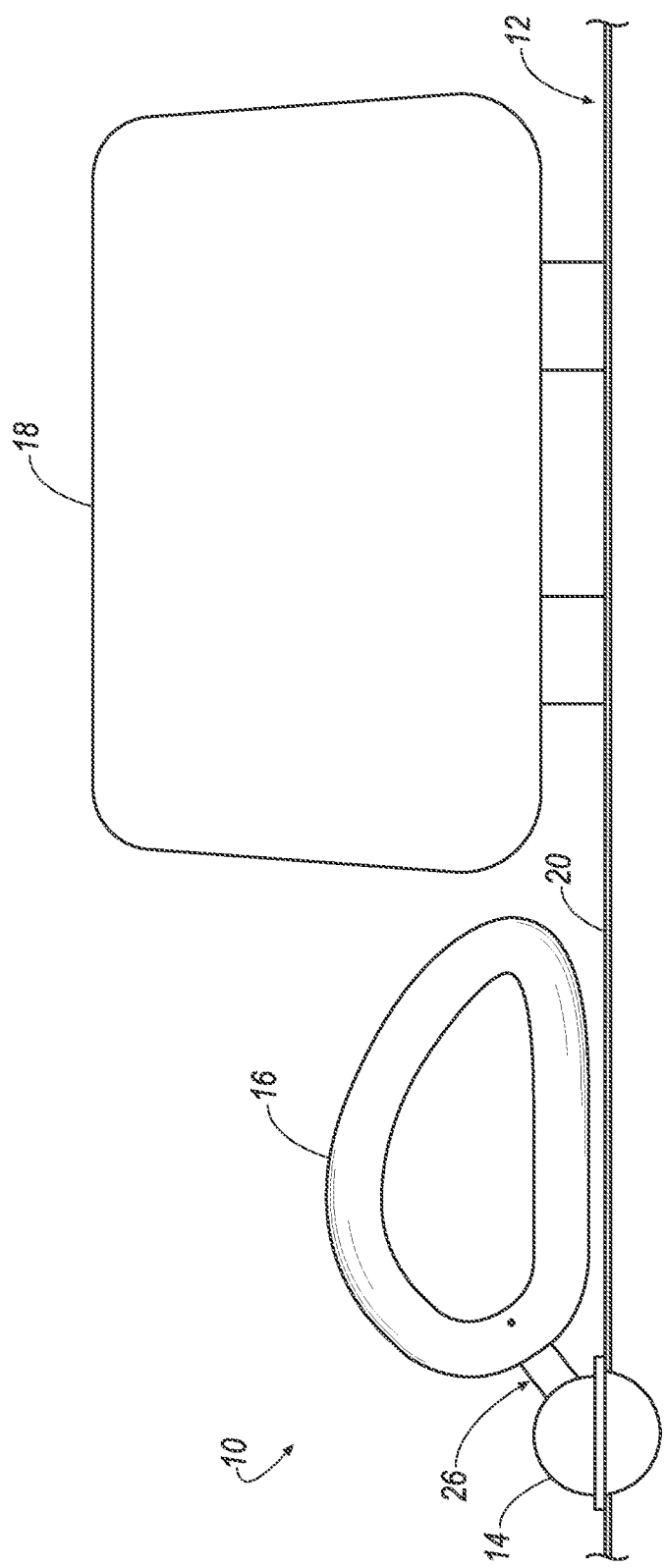
FIG. 1 is a rear-facing view of an example of a web guide positioned relative to a schematic illustration of a vehicle seat back having a head rest.

FIG. 1 shows a pivoting web guide assembly 10 incorporated into and embedded in an upper region of a seat back 12 of a vehicle seat. Web guide assembly 10 is anchored at its pivot 14 to a seat frame, not shown, which provides a structural skeleton of seat back 12. As described in more detail below, pivot 14 defines a pivot axis 46. Pivot 14 connects a web guide 16 to seat back 12. Guide 16 is loop shaped for receipt of and retention of seat belt webbing. Guide 16 can be either completely closed, or can have a slit facilitating passage of webbing into and out of guide 16.

Web guide assembly 10 is shown disposed on a first side of a discrete head rest 18, but it is possible for a non-adjustable head rest to be integrated into seat back 12. Seat trim 20, in an exemplary embodiment including fabric or leather overlaying a cushioning material, is disposed over the skeleton to provide the visible portion of seat back 12. Pivot 14 is at least partially covered or enclosed by seat trim 20.

Figure 2:
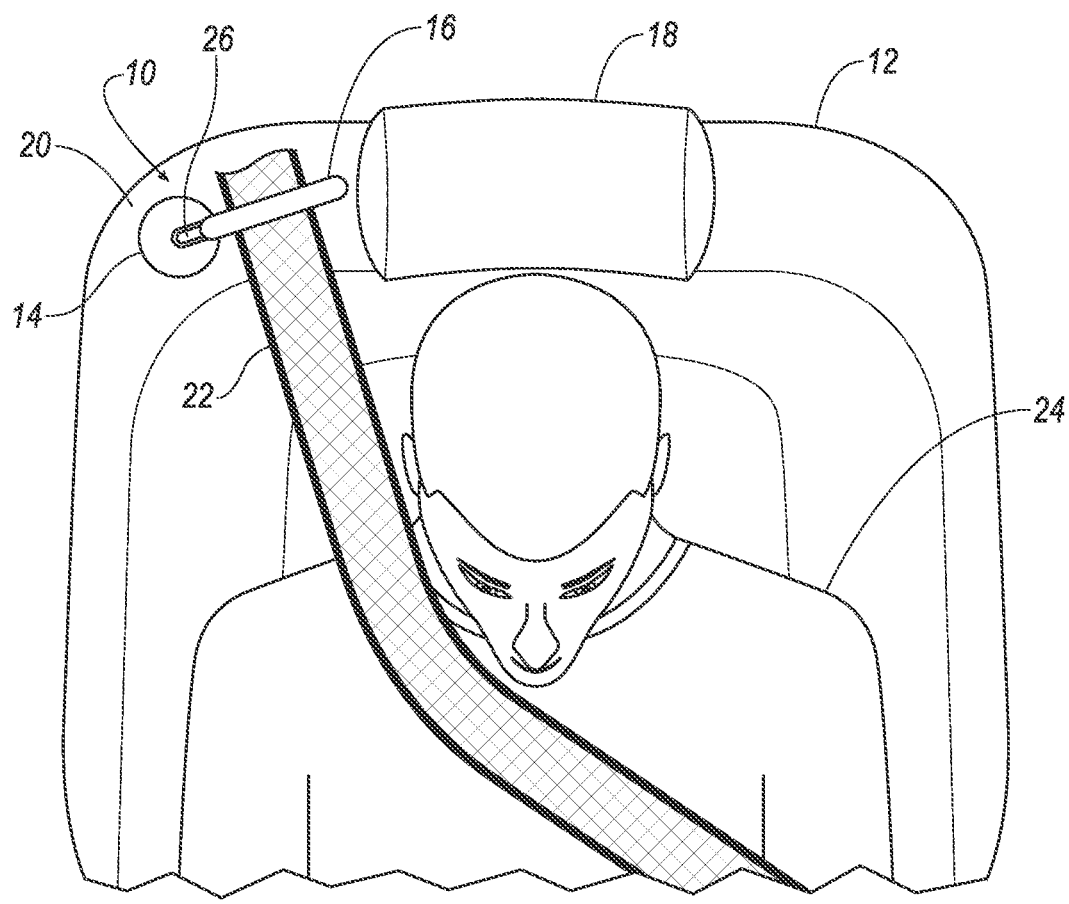
FIG. 2 is a plan view of the example of the web guide illustrated in FIG. 1 in an installed condition.

FIG. 2 shows web guide assembly 10 pivoted to a position accommodating a path of seat belt webbing 22. The illustrated portion of webbing 22 comprises a shoulder harness portion of a seat belt. Webbing 22 forms part of a three point restraint which in one exemplary embodiment alternatively includes a lap belt portion of webbing 22, or alternatively a separate piece of webbing forming lap belt. Webbing 22 in FIG. 2 extends across a shoulder of an occupant 24.

Figure 3:
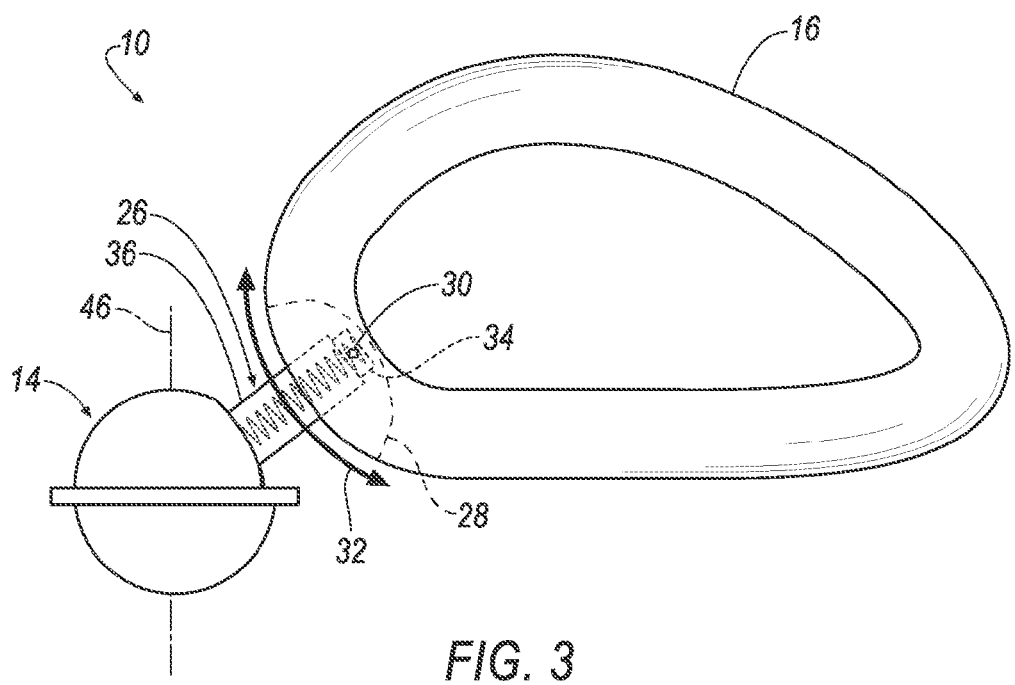
FIG. 3 is an enlarged view of the example of the web guide illustrated in FIG. 1.

FIG. 3 shows the pivoting web guide assembly 10 separate from the seat back 12. Pivot 14 is connected to web guide 16 by a connector 26. Connector 26 holds web guide 16 at a position spaced from pivot axis 46. Connector 26 may be rigidly fixed to guide 16 to allow no relative movement between an end of connector 26 engaging guide 16 and guide 16. As illustrated, a hinged connection is provided between connector 26 and guide 16. While a hinged connection could be achieved in a multiple of ways, such as having a U-shaped piece at an end of connector 26 receiving guide, and a hinge pin passing through both, a different arrangement is shown in FIG. 3. Guide 16 has a receiving notch 28 which receives a guide end of connector 26. A hinge pin 30 retains the guide end of connector 26 in notch 28. Notch 28 is defined by sides parallel to a plane defined by a maximum area section of guide 16. The view direction of FIG. 3 is normal to such a plane. Pin 30 is normal to the sides of notch 28 which enables the pivoting of connector 26 within notch 28 about pin 30. Pin 30 passes through both the guide end of connector 26 and guide 16. The direction of pivoting is illustrated by guide pivot arrow 32.

Connector 26 could be a fixed length shaft maintaining guide 16 at a fixed distance from pivot 14. Connector 26 as illustrated is a variable length, telescoping rod. Connector 26 has a first cylinder 34 of a first diameter slidably disposed within a second cylinder 36 of a larger diameter. A direction of axial displacement of web guide 16 relative to pivot 14 is defined by a common connector axis 38 of cylinders 34 and 36. The relative telescoping displacement of cylinder 34 and cylinder 36 occurs along connector axis 38.

Pivot 14 includes a hemispherical lower housing 40 and a hemispherical upper bezel 42 that covers housing 40 cooperatively defining a spherical void therein. A first part of bezel lip 44 extends radially outwardly from bezel 42, and wraps downward, slightly overlapping an upper portion of housing 40. Bezel lip 44 defines a first pivot plane. Bezel lip 44 prevents debris from entering housing 40. Pivot axis 46 defined cooperatively by bezel 42 and housing 40 is normal to the pivot plane. Bezel 42 is axially fixed to housing 40. While not shown, housing 40 can be provided with a radially outwardly extending flange, the flange being overlapped by lip 44. Lip 44 is wrapped under the flange to enable rotation of bezel 42 about axis 46 while maintaining a connection between bezel 42 and housing 40 which resists separation of bezel 42 from housing 40 responsive to a force along axis 46 in a direction tending to separate bezel 42 from housing 40.

Figure 4:
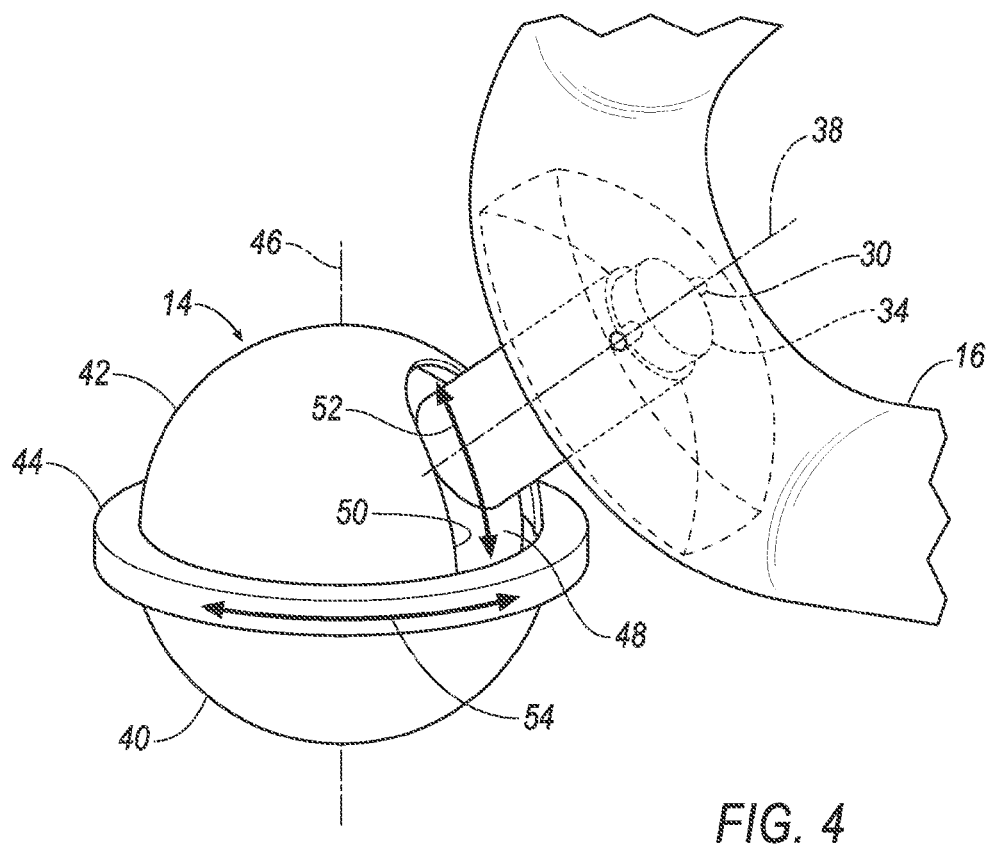
FIG. 4 is an enlarged perspective view of the example of the web guide illustrated in FIG. 1.

In FIG. 4, a spherical bearing 48 is received by housing 40 and bezel 42. There is sufficient clearance between bearing 48 and the void within housing 40 and bezel 42 to permit bearing 48 to rotate freely therein. Bearing 48 is illustrated as receiving a pivot end of connector 26 defined by second cylinder 36. A channel or slot 50 in bezel 42 accommodates second cylinder 36 passing through bezel 42 and into bearing 48. Bezel 42, bearing 48 and connector 26 are able to rotate together as a unit about axis 46. Sides of slot 50 are parallel to a line defined by a plane intersecting bezel 42 and coincident with pivot axis 46. Slot 50 accommodates a pivoting motion of bearing 48 and connector 26 in the direction of a bearing pivot arrow 52 with a range of about 45 degrees. Bezel 42 and bearing 48 are able to rotate relative to housing 40 about axis 46 in the direction of a bezel pivot arrow 54. Web guide 16 and connector 26 and bearing 48 are further rotatable relative to housing 40 and bezel 42 about connector axis 38. Rotation of bearing 48 about pivot axis 46 could be achieved if bearing 48 had an alternative shape, such as a cylinder or a cone, so long as a section normal to the axis resulted in a circular shape and the void defined by housing 40 and bezel 42 is of a complementary shape.

Figure 5:
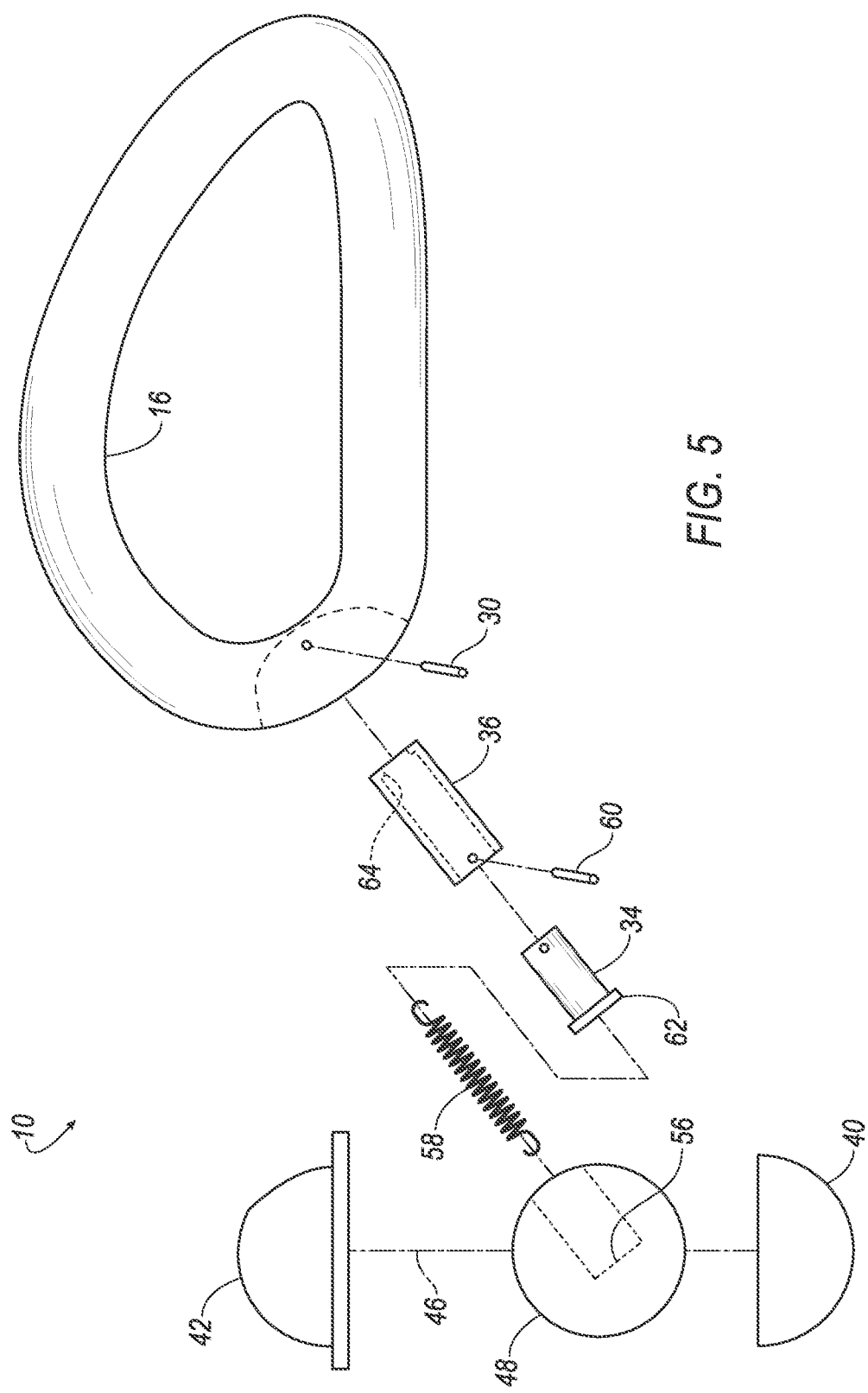
FIG. 5 is an exploded view of the example of the web guide illustrated in FIG. 1.
Figure 6:
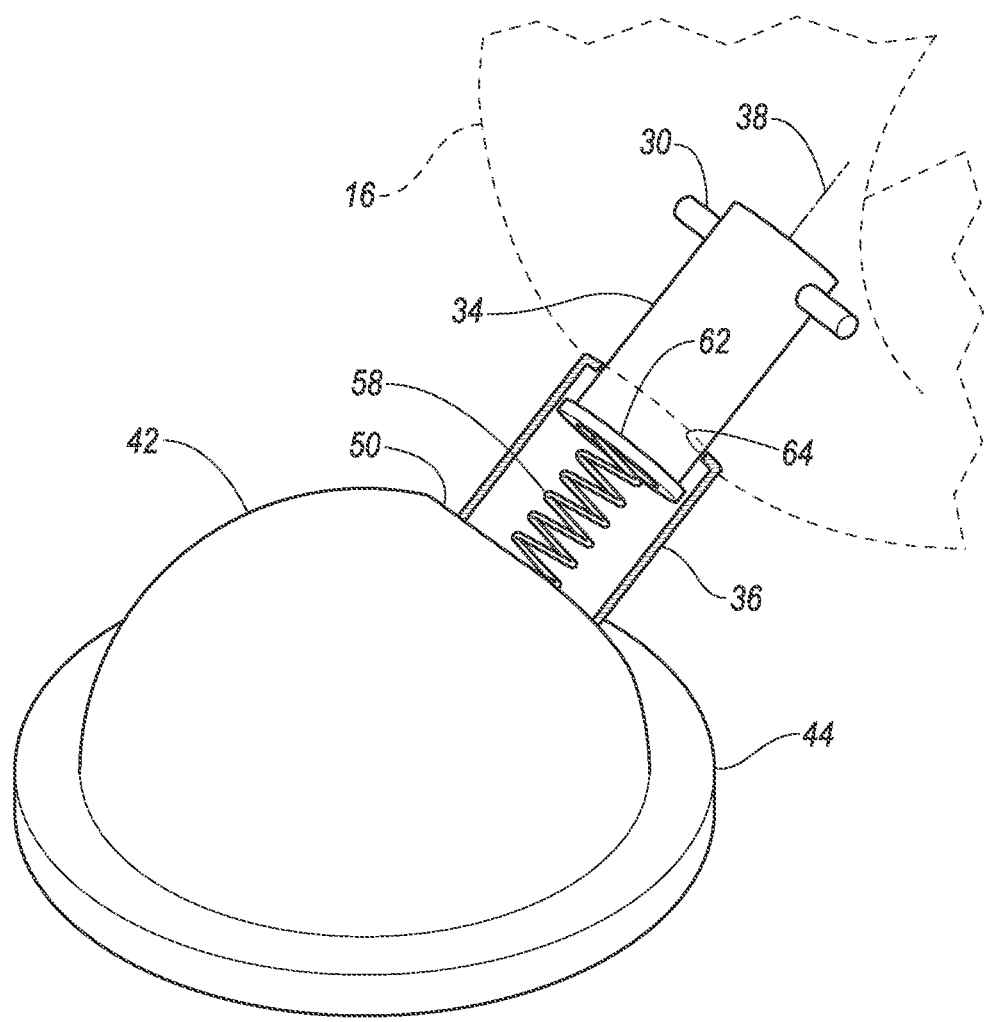
FIG. 6 is an enlarged perspective view of the example of a pivot portion of the web guide illustrated in FIG. 1.

In FIG. 5, the components comprising the illustrated pivoting web guide assembly 10 are shown in more detail in an exploded view. Bearing 48 has a receiving aperture 56 that receives the pivot end of connect 26, with the pivot end being provided by the second cylinder 36. In the illustrated assembled guide assembly 10, connector 26 is fixed to bearing 48. Aperture 56 is of a diameter that provides a press-fit relationship between the pivot end of the connector and bearing 48 to prevent relative motion therebetween. The use of press-fitting is exemplary. Alternative attaching structures could include a welded joint connecting connector 26 and bearing 48, and a pin passing through both connector 26 and bearing 48.

An exemplary spring 58 is operably disposed between first cylinder 34 and second cylinder 36, biasing web guide 16 toward pivot 14. In the illustrated embodiment, spring 58 is a tension spring and incorporates a loop or hook end on each end. A first loop on a first end of spring 58 is disposed within first cylinder 34. The first loop receives pin 30. Pin 30 also passes through receiving apertures in guide 16 and first cylinder 34. The receiving apertures in guide 16 are on opposite sides of notch 28 and are axially aligned to enable receipt of pin 30. Pin 30 has a press fit relationship with the receiving aperture on at least one side of guide 16. Pin 30 has a clearance fit with the pin-receiving aperture through first cylinder 34.

The loop on a second end of tension spring 58 is disposed within second cylinder 36 and receives an anchor pin 60. Anchor pin 60 also passes through aligned receiving apertures in second cylinder 36. The press fit relationship between second cylinder 36 and bearing 48 would retain pin 60 in cylinder 36. Anchor pin 60 may have a press-fit relationship with at least one of the pin-receiving aperture through second cylinder 36 to facilitate assembly, but a press fit relationship is not required to provide the desired functionality. As noted in the discussion of the attachment of second cylinder 36 to bearing 48, the bearing-to-connector 26 connection can be facilitated by a pin instead of a press fit. One approach to providing a pinned connection is to provide an aperture (not shown) passing through bearing 48 in alignment with and extending across receiving aperture 56. Pin 60 would be longer, long enough to engage bearing 48 on both sides of aperture 56. Pin 60 would have a press fit relationship with bearing 48 on at least one side of aperture 56.

Cylinders 34 and 36 are provided with features that limit the relative axial displacement of the cylinders 34 and 36 to prevent the separation of the cylinders. Without a travel restriction, it is possible that web guide 16 could be axially displaced sufficiently far along connector axis 38 to pull first cylinder 34 out of engagement from second cylinder 36. In the illustrated embodiment, the travel restriction is provided by a combination of a radially outwardly extending first lip 62 on an outside diameter of first cylinder 34 at an end distal to the apertures for hinge pin 30, and a radially inwardly extending second lip 64 on an inside diameter of second cylinder 36 at an end distal to the apertures for anchor pin 60. When there is no load in a direction tending to move web guide 16 away from pivot 14, spring 58 biases first cylinder 34 to an unloaded position in which substantially all of first cylinder 34 is disposed within second cylinder 36. Of course the end of second cylinder 36 having second lip 64 will not be able to move past hinge pin 30. When web guide 16 is biased with sufficient force away from pivot 14 to overcome the resistance of spring 58, travel is limited by engagement of first lip 62 against second lip 64. An alternative to providing lips 62 and 64 which completely circumscribe cylinders 34 and 36 is the provision of radially extending tabs on cylinders 34 and 36 which only partially circumscribe cylinders 34 and 36. In such an arrangement, it may be necessary to restrict the relative rotation of cylinders 34 and 36 about connector axis 38.

The above-described pivoting web guide assembly 10 permits web guide 16 to rotate about pivot bearing 48 in a plurality of directions, web guide 16 to pivot relative to connector 26 disposed between a pivot and the web guide, and extend axially in the direction of the connector axis. The ability to so displace web guide 16 allows seat belt webbing 22 to exit guide 16 and encounter occupant 24 at different angles providing an improved belt fit for a wider range of occupant sizes. Webbing 22 can be directed by guide assembly 10 away from the neck and over the shoulder, providing proper belt routing and avoiding neck chaffing. Different shapes and types of web guide can be employed. The illustrated embodiment uses a spring-loaded telescoping cylinder connector 26 that allows web guide 16 to be pulled inboard towards a center of the seat when desired to accommodate smaller occupants. Spring 58 creates tension between the 2 cylinders, pulling web guide 16 outboard, away from a center of the seat and seat back 12 when a more outboard placement is preferred by larger occupants. Bezel 42 is disposed over housing 40 and covers bearing 48, and can also rotate about housing 40 which in the illustrated embodiment is disposed below seat trim 20. A benefit of the illustrated assembly 10 is the enablement of near free or floating motion of the web guide while adjusting to different size occupants, providing both safety and comfort for the occupant, while maintaining structural integrity in the event of an impact event.

Figure 7:
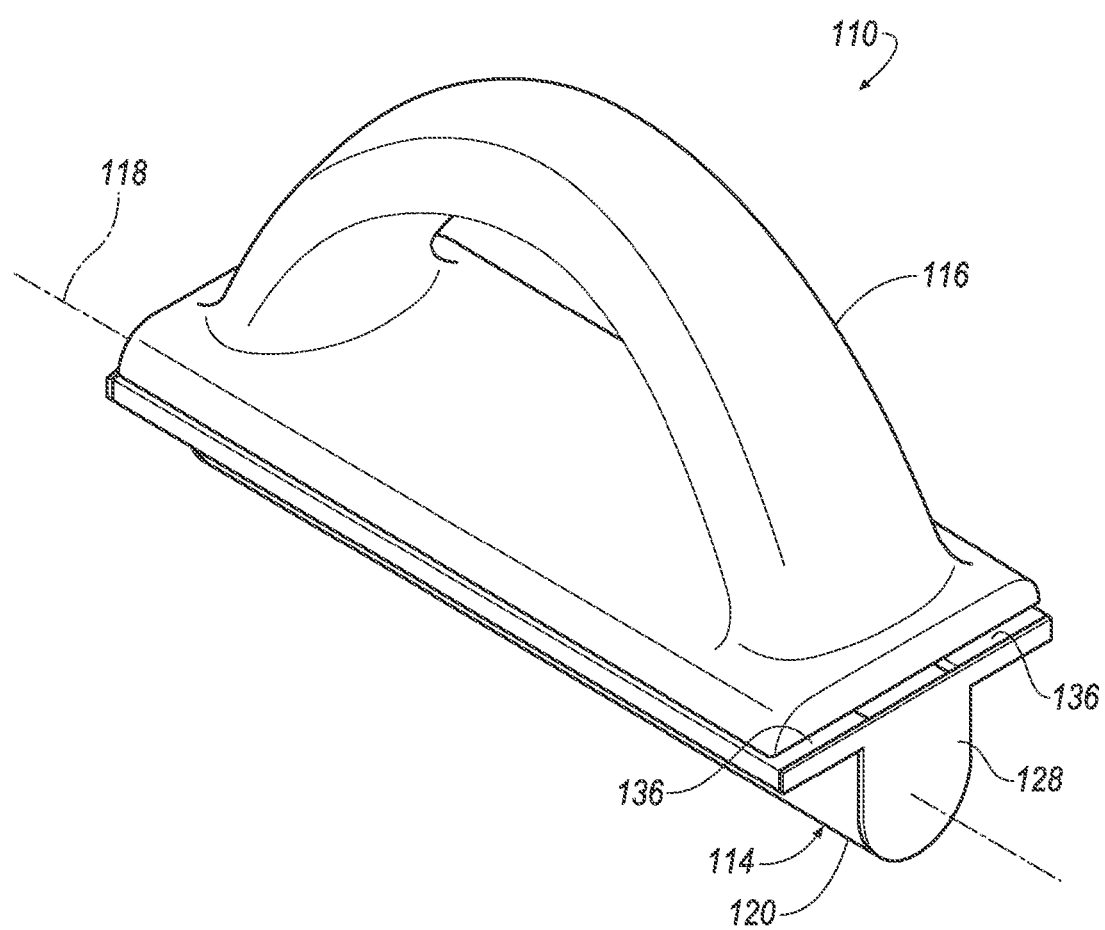
FIG. 7 is a perspective view of an example of an alternative web guide.

An alternative embodiment of a web guide assembly, a track web guide assembly 110, is illustrated in FIG. 7. Web guide assembly 110 is mounted to a seat back 112 and includes a track base 114 and a web guide 116. Web guide 116 is able to translate relative to base 114 in a first direction parallel to a housing axis 118. Web guide 116 is not limited to the illustrated shape, and may be of any shape suitable for receiving seat belt webbing, so long as it includes a suitable sliding surface on a bottom or lower side for engagement with track base 114.

Track base 114 includes a slider housing 120 featuring a U-shaped channel 130 closed on the ends thereof by track end caps 128. Housing 120 provides sliding platforms 136 engaged by the sliding surface of web guide 116.

Assembly 110 is incorporated into and embedded in an upper region of a seat back 112 of a vehicle seat. Web guide assembly 110 is fixedly anchored at its slider housing 120 to the seat frame, not shown. Seat trim 122 covers the seat frame. Web guide 116 has a predetermined amount of displacement along the housing axis 118. Web guide 116 is biased by a biasing spring 144 to a first position distal to a seat center.

Figure 8:
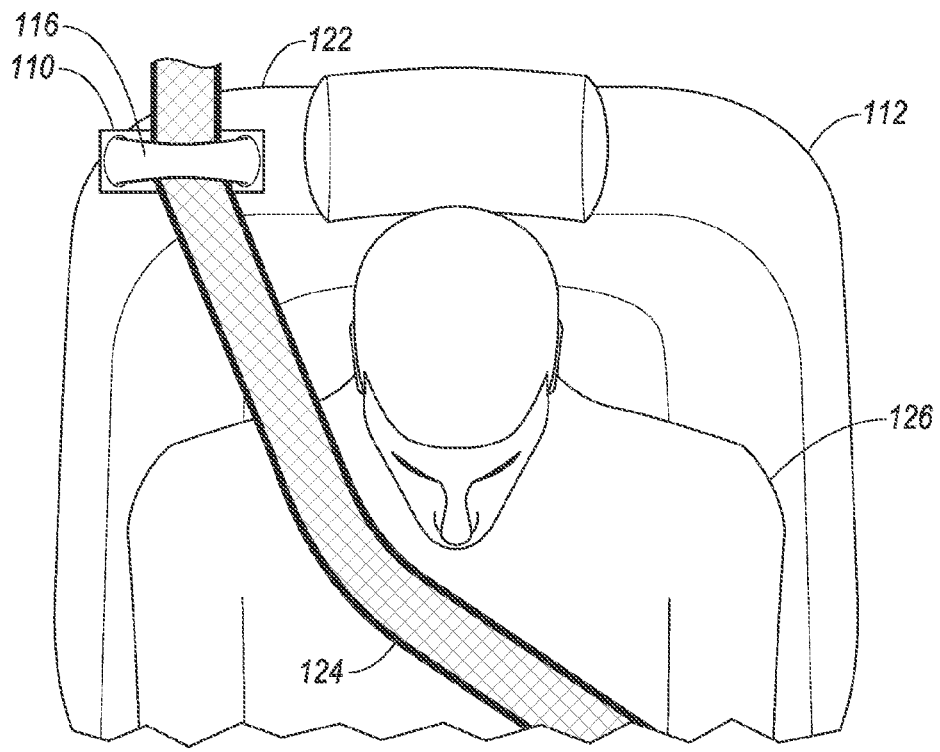
FIG. 8 is a plan view of an example of the web guide illustrated in FIG. 7 in an installed condition and in a first position.
Figure 9:
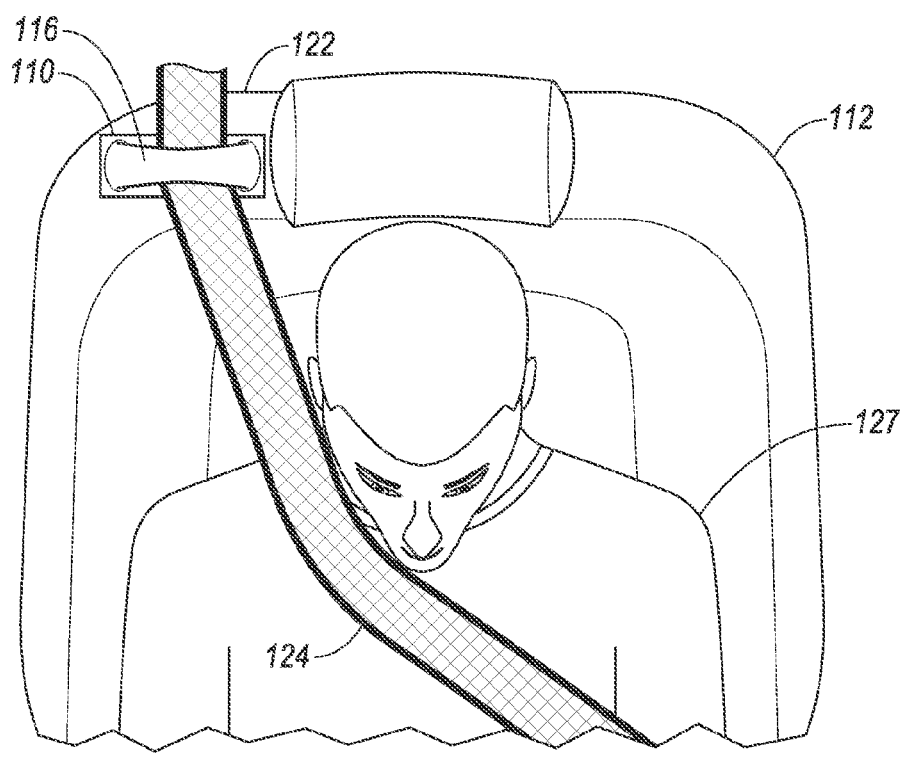
FIG. 9 is a plan view of an example of the web guide illustrated in FIG. 7 in an installed condition and in a second position.

In FIG. 8, web guide 116 is illustrated in an outboard location, maintaining a webbing 124 distal to a center of the seat, to accommodate a large occupant 126. In FIG. 9, web guide 116 is illustrated in an inboard location, maintaining webbing 124 more proximate to the center of the seat to accommodate a small occupant 127.

Figure 10:
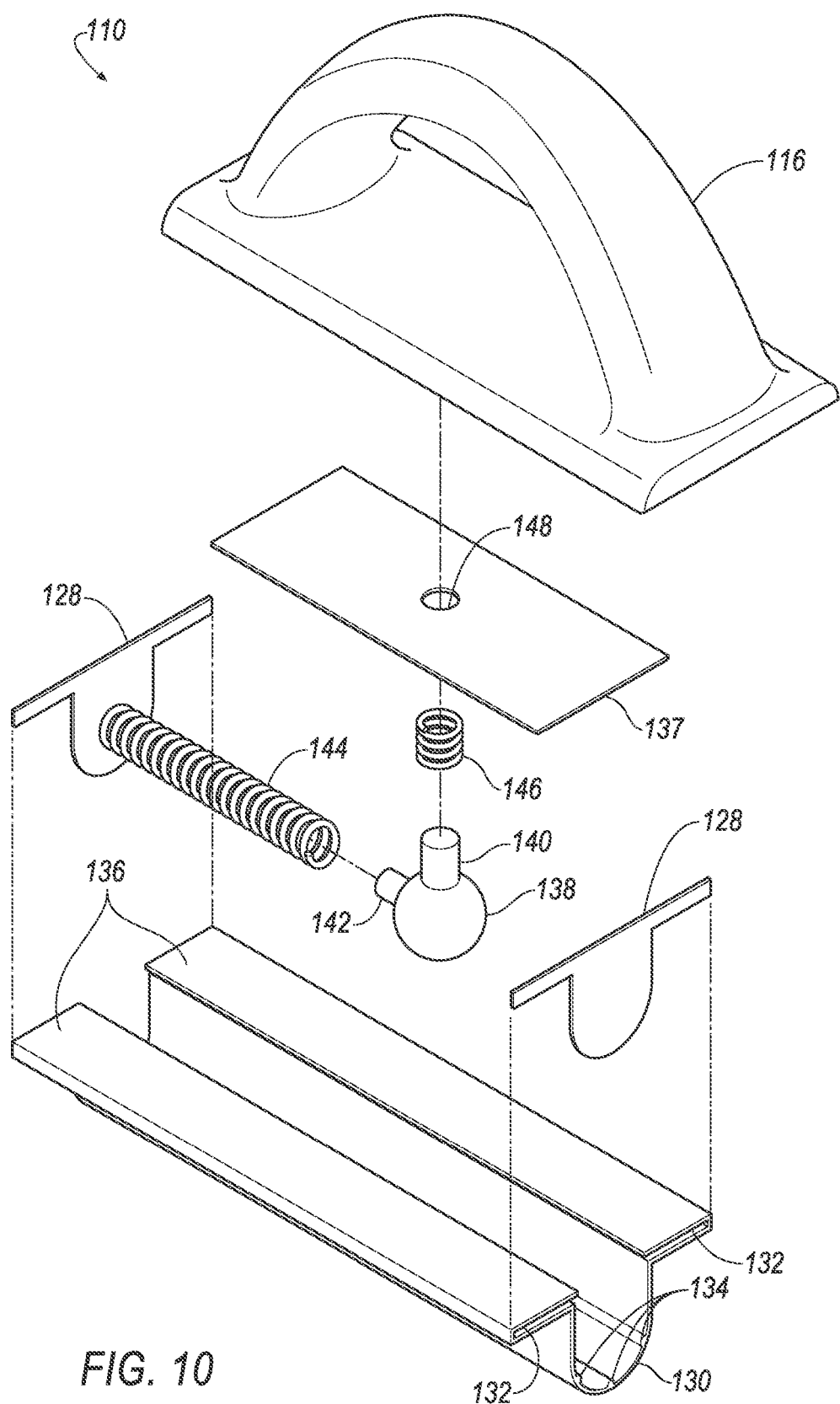
FIG. 10 is an exploded view of an example of the web guide illustrated in FIG. 7.

In FIG. 10, parts comprising the illustrated web guide assembly 110 are shown in more detail. Housing 120 includes and is substantially defined by an axially extending U-shaped channel 130. Channel 130 is framed in a plan view direction by a pair of opposed sliding platforms 136. Sliding platforms 136 of the illustrated housing are extensions of first flanges which extend outwardly away from channel 130, fold upward, and then bend inward to form platforms 136. Sliding platforms 136 and the underlying flanges define a pair of co-planar side grooves 132. Side grooves 132 are sized to cooperatively receive a guide plate 137. In the illustrated embodiment, axially extending glide rails 134 are provided near the bottom of an inside surface of channel 130. Channel 130 and grooves 132 can each be characterized as a guide feature.

A slider 138, spherical in the illustrated embodiment, is disposed in the bottom of channel 130 in slideable engagement with glide rails 134. Slider 138 has two posts extending therefrom. A first post 140 extends upward, into engagement with guide plate 137. An elevation spring 146 is illustrated as being disposed over first post 140, and provides a bias tending to separate slider 138 from guide plate 137. A second post 142 extends parallel to axis 118, and is directed to a first of end caps 128. Biasing spring 144 is disposed between the first of end caps 128 and slider 138. Spring 144 as illustrated is a compression coil spring and has an internal diameter of a size enabling receipt of second post 142.

Guide plate 137 is slideably disposed in side grooves 132 for movement in the direction of axis 118. Guide plate 137 is shorter in length than housing 120. The range of available axial motion of web guide 116 relative to housing 120 and the seat frame is no more than the length of housing 120 minus the length of guide plate 137. Guide plate 137 has an aperture 148 that receives first post 140. If there is a desire to keep plate 137 at a fixed distance relative to an engagement surface of slider 138, aperture 148 can be sized to provide a press fit relationship with first post 140. An alternative means of providing engagement between plate 137 and slider 138 is to provide a threaded connection between plate 137 and first post 140. In the illustrated embodiment, spring 146 is provided consistent with an alternative configuration to maintain a substantially constant force biasing slider 138 away from plate 137. This is achieved by having a clearance fit relationship between first post 140 and aperture 148.

In the illustrated embodiment, web guide 116 is fixed to slider 138 through first post 140. The first post 140 to web guide 116 connection can take several forms. One possible form is to provide an aperture in a bottom or lower side of web guide 116 receiving first post 140 in a press fit relationship. A press-fit relationship resists rotation of web guide 116 relative to housing 120. Alternatively, first post 140 has a snap ring disposed in a circumferential groove at an end of first post 140 distal to slider 138, and the aperture in web guide 116 provides a clearance fit with the first post. The aperture in web guide 116 further has a second diameter larger than the first diameter above the sliding surface, enabling the expansion of the snap ring into a cavity in guide 116. With the snap ring expanded, web guide 116 is pivotably retained on slider housing 120. Web guide 116 can be alternatively provided with a projection below a center of its sliding surface with the projection running the length of web guide 116 to prevent pivoting of web guide 116. A cross section of the web guide having the described projection has a T shape. The projection extends into a gap in housing 120 between sliding platforms 136. A notch is formed in the end caps complementary in shape to the projection to permit an end of guide web guide 116 to slide past end caps 128. Axial travel of web guide 116 relative to housing 120 is still limited by engagement of guide plate 137 with end caps 128.

The above-described track web guide assembly 110 permits web guide 116 to translate laterally relative to the seat back. Optionally, web guide 116 may pivot about a pivot axis established by a relationship between first post 140 and aperture 148. The ability to so displace web guide 116 allows seat belt webbing 124 to exit guide 116 and encounter occupants 126 and 127 at different angles and lateral locations to provide an improved belt fit for a wider range of occupant sizes and shapes. Webbing 124 is directed by guide assembly 110 away from the neck and over the shoulder, providing proper belt routing and avoiding neck chaffing. Different shapes and types of web guides can be employed. The illustrated embodiment uses a spring-loaded slider 138 that biases web guide 116 away from a center of the seat, yet allows guide 116 to be pulled inboard towards a center of the seat when desired to accommodate smaller occupants. Spring 144 creates a bias force between housing 120 and slider 138, pushing web guide 116 outboard, away from a center of the seat and seat back 112 when a more outboard placement is preferred by larger occupants. Guide plate 137 translates in side grooves 132. The illustrated assembly 110 beneficially enables near free or floating motion of the web guide while adjusting to different size occupants, providing both safety and comfort for the occupant, while maintaining structural integrity in the event of an impact event.

Further possible variations of web guide assembly 110 include a version without a slider. For example, guide plate 137 could be provided with a spring engagement tab extending below a lower surface of plate 137. Spring 144 is then disposed between the tab and the first of end caps 128. Housing 120 would have a much smaller channel 130, providing just a clearance fit sized to retain spring 144, and to prevent buckling of spring 144 when it is compressed.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

It is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. Unless otherwise stated or qualified herein, all claim terms are intended to be given their plain and ordinary meanings. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A seatbelt web guide comprising:
   a web guide in the shape of a loop;
   a pivot adapted to be fixed to a seat back and defining a first pivot axis;
   a connector disposed between and connecting the web guide to the pivot at a position in which the web guide is spaced from the first pivot axis;
   wherein the pivot has a first pivot part and a second pivot part with the second pivot part being rotatable with respect to the first pivot part about the pivot axis, and the connector fixed to the second pivot part for rotation about the axis therewith,
   further wherein the connector comprises a first connector part and a second connector part with the second connector part being slideably engaged with the first connector part.

2. The web guide assembly of claim 1 wherein the connector comprises a spring biasing the first connector part relative to the second connector part.

3. The web guide assembly of claim 1 wherein the connector is connected to the web guide by a pin having a clearance fit with one of the web guide and the connector forming a hinge between the connector and the web guide.

4. The web guide assembly of claim 1 wherein the pivot includes
   a housing having a circular cross section in a plane normal to the pivot axis and defining the pivot axis;
   a bezel disposed over the housing and defining a void therebetween;
   a bearing disposed in the housing having a clearance fit with respect to the void between the bezel and the housing; and
   the connector passing through an opening in the bezel and fixed to the bearing for rotation with the bearing about the pivot axis.

5. The web guide assembly of claim 4 wherein
   the void defined by the housing and the bezel together is spherical in shape and
   the bearing is spherical in shape;
   the opening through the bezel is a slot with sides spaced to clear movement of the connector and parallel to a line defined by a plane intersecting the bezel and coincident with the pivot axis.

6. A seatbelt web guide in the shape of a loop adapted to be fixed to a seat back comprising:
   a web guide in the shape of a loop;
   a pivot adapted to be fixed to a seat back and defining a first pivot axis;
   a connector disposed between and connecting the web guide to the pivot at a position in which the web guide is spaced from the first pivot axis;
   wherein the pivot has a first pivot part and a second pivot part with the second pivot part being rotatable with respect to the first pivot part about the pivot axis, and the connector fixed to the second pivot part for rotation about the axis therewith,
   further wherein the connector is connected to the web guide by a pin having a clearance fit with one of the web guide and the connector forming a hinge between the connector and the web guide.

7. A seatbelt web guide in the shape of a loop adapted to be fixed to a seat back comprising:
   a web guide in the shape of a loop;
   a pivot adapted to be fixed to a seat back and defining a first pivot axis;
   a connector disposed between and connecting the web guide to the pivot at a position in which the web guide is spaced from the first pivot axis;
   wherein the pivot has a first pivot part and a second pivot part with the second pivot part being rotatable with respect to the first pivot part about the pivot axis, and the connector fixed to the second pivot part for rotation about the axis therewith,
   further wherein the pivot includes
   a housing having a circular cross section in a plane normal to the pivot axis and defining the pivot axis;
   a bezel disposed over the housing and defining a void therebetween;
   a bearing disposed in the housing having a clearance fit with respect to the void between the bezel and the housing; and
   the connector passing through an opening in the bezel and fixed to the bearing for rotation with the bearing about the pivot axis.

8. The web guide assembly of claim 7 wherein
   the void defined by the housing and the bezel together is spherical in shape and
   the bearing is spherical in shape;
   the opening through the bezel is a slot with sides spaced to clear movement of the connector and parallel to a line defined by a plane intersecting the bezel and coincident with the pivot axis.

9. A seatbelt web guide assembly adapted to be fixed to a seat back comprising:
   a web guide in the shape of a loop;
   a mount disposed between and connecting the web guide and the seat back with the mount having a first mount part and a second mount part;
   the first mount part being adapted to be fixed to the seat back and defining a sliding axis;
   the second mount part being one of slideably disposed in and slideably received by least a portion of the first mount part;
   the web guide connected to the second mount part for movement therewith;
   a spring disposed between the first mount part and the second mount part and the spring biasing the first mount part relative to the second mount part.

10. The web guide assembly of claim 9 wherein
    the first mount part is defined by a pivot adapted to be fixed to a seat back and the pivot defining a first pivot axis and a first connector part of a connector defining the sliding axis and
    the second mount part is defined by a second connector part of the connector slideably engaged with the first connector part and coaxial with first connector part and connected on one end to the web guide.

11. The web guide assembly of claim 10 wherein the connector comprises the spring disposed between the first mount part and the second mount part.

12. The web guide assembly of claim 11 wherein the second connector part is connected to the web guide by a pin having a clearance fit with one of the web guide and the second connector part pivotably connecting the connector and the web guide.

13. The web guide assembly of claim 10 wherein the pivot includes a housing having a circular cross section in a plane normal to the pivot axis and defining the pivot axis;
a bezel disposed over the housing and defining a void therebetween;
a bearing disposed in the housing having a clearance fit with respect to the void between the bezel and the housing; and
the connector passing through an opening in the bezel and fixed to the bearing for rotation with the bearing about the pivot axis.

14. The web guide assembly of claim 13 wherein
the void defined by the housing and the bezel together is spherical in shape and
the bearing is spherical in shape;
the opening through the bezel is a slot with sides spaced to clear movement of the connector and parallel to a line defined by a plane intersecting the bezel and coincident with the pivot axis.

\* \* \* \* \*